July 24, 1962 F. L. LAWRENCE 3,045,974
REVERSIBLE POWER-DRIVEN WINCH WITH AUTOMATIC
CONTROL OF REVERSE SPEED
Filed Nov. 7, 1960 2 Sheets-Sheet 1

INVENTOR.
FRANK L. LAWRENCE

BY
*Barney & Sons*
ATTORNEYS

July 24, 1962　　　　F. L. LAWRENCE　　　　3,045,974
REVERSIBLE POWER-DRIVEN WINCH WITH AUTOMATIC
CONTROL OF REVERSE SPEED
Filed Nov. 7, 1960　　　　　　　　　　　2 Sheets-Sheet 2

INVENTOR.
FRANK L. LAWRENCE
BY
Barnes & Seed
ATTORNEYS

United States Patent Office
3,045,974
Patented July 24, 1962

3,045,974
REVERSIBLE POWER-DRIVEN WINCH WITH
AUTOMATIC CONTROL OF REVERSE SPEED
Frank L. Lawrence, North Surrey, British Columbia,
Canada, assignor to Aerialmatic Engineering Ltd.,
British Columbia, Canada, a corporation
Filed Nov. 7, 1960, Ser. No. 67,687
19 Claims. (Cl. 254—166)

This invention relates to reversible winches of a type powered both in forward and reverse at variable speeds, and is a continuation-in-part of my application filed June 17, 1958, which matured as U.S. Pat. No. 2,959,396, dated November 8, 1960.

As a principal object the invention aims to provide a winch of this nature having a governor means which is made active or inactive at will and operating when active to automatically regulate the speed at which the winch turns in reverse so as to pay out cable from the winding drum of the winch only as the same is required, by such token preventing a slack line from developing and thus precluding any possibility of the cable overrunning itself on the drum and producing what is commonly termed a "bird's nest" condition.

A further principal object is to provide a winch particularly engineered for use on a towing vehicle such, for example, as a logging tractor, with a fairleader being provided guiding the cable to and from the tractor on a low level, preferably below the horizontal plane occupied by the axes about which the ground wheels of the tractor turn, and having the winding drum of the winch located in such remote relation to the fairleader that the cable will be self-laying as the same is brought in to the drum by forward rotation of the winch.

An additional particular object is to provide a canopied logging tractor having its cable-winding winch mounted at the stern end of the tractor's canopy.

As a still further object the invention aims to provide a tractor having a canopy-mounted winch and characterized by its employment of a standard giving direct support to the winch and itself footing upon and made integral with the vehicle's main frame to pass downwardly into said main frame work loads originating with the tow, and wherein said standard is a channel-shaped member housing the cable in its passage between the fairleader and the winch and having a complementing latticework structure extending laterally from opposite sides of the standard to protect the operator and also guard winch controls which are subject to manual operation.

It is a yet further object of the invention to engineer a perfected logging tractor assembly including a trailing high arch and characterized in that a draw-bar for the high arch is coupled directively to said fairleader in a manner such that the high arch and the fairleader will swing as one about the vertical center of the fairleader's swivel head.

A further object still is to provide a winch and governor assembly having the parts so constructed and arranged that the governor will automatically stop the rotation of the winding drum should the cable be completely unwound from the drum in course of paying out the cable. This precludes any danger of prematurely drawing in the cable by rewinding the same upon the drum in a counter direction, as would perforce occur were the drum to continue turning and responsively bring the dead-ended extremity of the cable past center after a bearing of the drum surface.

These and yet additional objects and advantages of the invention will appear and be understood in the course of the following description and claims, the invention consisting in the novel construction and in the adaptation and combination of parts hereinafter described and claimed.

Figure 6:
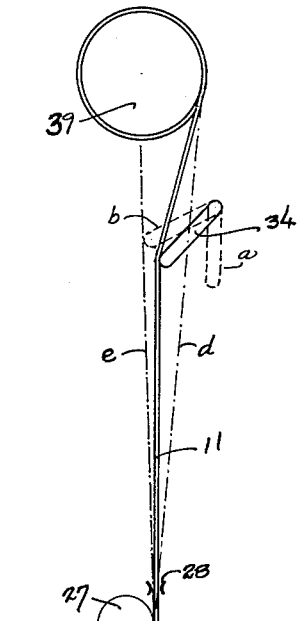
Figure 5:
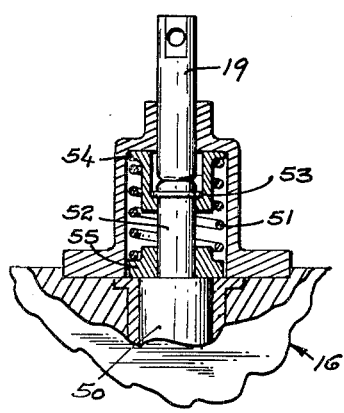
Figure 2:
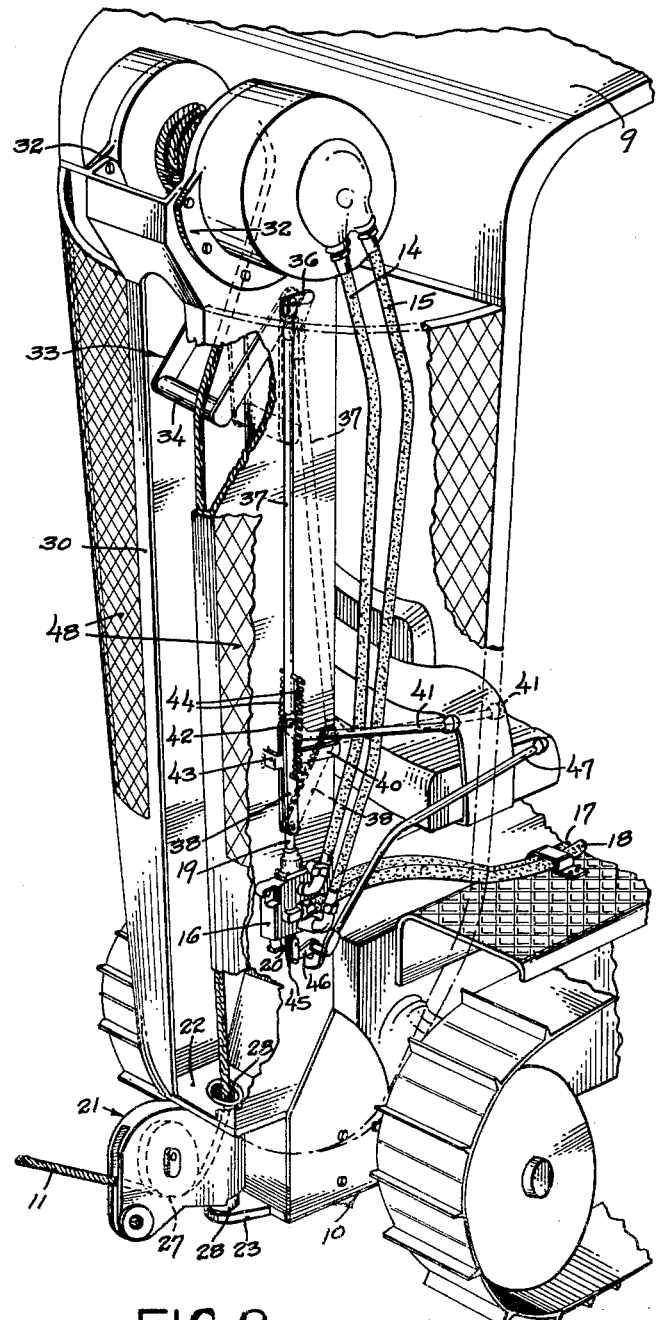
FIG. 2 is a fragmentary perspective view of the tractor, winch and fairleader elements of the assembly, the scale being enlarged from that of FIG. 1.

FIG. 5 is a fragmentary enlarged-scale vertical sectional view detailing spring-loading mechanism provided for the control valve of the present invention for yieldingly urging the valve into neutral position; and FIG. 6 is a schematic side elevational view illustrating the manner in which parts are arranged so as to automatically arrest the rotation of the winding drum in the event of a cable which is wound thereon being completely payed out.

Referring to said drawings, the numeral 10 designates the main frame of a canopied tractor of a type commonly used in logging operations where a tow-cable 11 runs from the winding drum 39 of a tractor-carried winch over a high arch 12 trailed by the tractor. The winch 13 which I prefer to employ is a variable-speed hydraulically powered reversible unit. A winch eminently suited for the purpose is illustrated and described in my United States Letters Patent No. 2,959,396, issued Nov. 8, 1960, and suffice it to here say that such winch houses a reversible rotary-type fluid motor. Flexible pressure-type hoses 14 and 15 connect the motor with a 4-way 3-position control valve 16. A hose 17 extends to the valve body from the high pressure side of an associated pump (not shown) while a hose 18 leads from the valve body to a supply reservoir for the pump. A spring-loaded control spool 50 for the valve is mounted for axial movement and at each of its two ends presents an exposed stem, as 19 and 20.

According to the present invention a fairleader 21 has its swivel head mounted for swing movement about a vertical axis between the vertically spaced arms 22—23 of a rearwardly pointed yoke fixed to the aft end of the tractor's main frame, and the draw-bar 24 of the high arch 12 connects by a horizontal pivot pin 25 to the swing-frame 26 of such fairleader. The fairleader thus automatically aligns itself with the high arch. The tow-cable 11 passes from the sheave 29 of the high arch under a sheave 27 journaled between spaced-apart cheeks of said swing-frame and thence feeds vertically into the hollow center of the upper of two trunnion pins 28 which produce the swivel mounting for the swivel head. The axial center of said hollow trunnion lies tangent or approximately tangent to the sheave 27.

A rearwardly facing channel-shaped standard 30 extends upwardly from the yoke-arm 22 to the canopy. The winch surmounts this standard in a position to the immediate rear of the canopy with its winding drum 39 overlying and exposed to the top opening of the channel so that windings of the cable 11 will run freely within said channel as the same leads to and from the hollow center of the trunnion pin 28. I have shown the winch as being secured to the standard by means of ears 32 which project from the perimeter of respective gear housings provided at each of the two ends of the winch.

A U-bar 33 is pivotally mounted within the channel intermediate the winding drum and the fairleader for reciprocal fore-and-aft swing movement about a transverse horizontal axis. In its arcuate swing travel the bar moves between a rear active position and a forward inactive position, being active and inactive in the sense that the cross-arm 34 of the U-bar is brought into and out of a position whereat the same is subjected to depression pressure from the tow-cable as the latter runs between the winding drum and the hollow center of the trunnion pin 28. One end of the U-bar's pivot shaft 35 projects through a side wall of the channel standard 30 and has a crank arm 36 attached to its exposed extremity. Motion of this crank arm as the U-bar is subjected to said depression pressure imparts endwise movement to the upper section 37 of a jointed connecting rod disposed vertically along the side of the standard. The described control valve 16 is mounted below said jointed rod with its spool 50 more or less vertically aligned with a perpendicular dropped from the head end of the rod, and has the upper stem 19 pivoted to a lower section 38 of said rod. The lower section is composed of two parallel spaced links received at opposite sides of a rigidly mounted guide bar 40.

Figure 1:
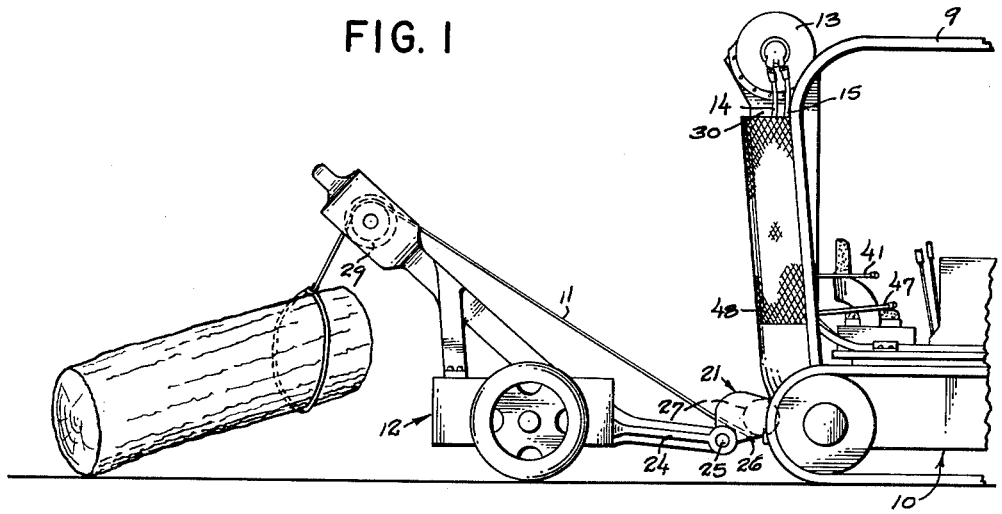
FIGURE 1 is a somewhat schematic side elevational view illustrating a logging tractor assembly having the parts constructed and arranged in accordance with the preferred teachings of the present invention.
Figure 3:
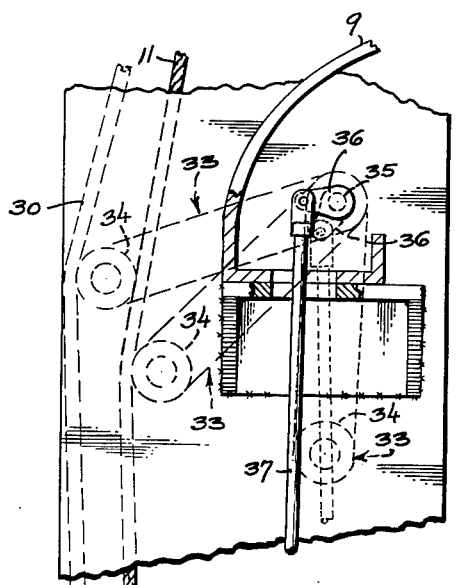
FIG. 3 is a large-scale fragmentary longitudinal vertical sectional view detailing the automatic speed control for use when paying out cable from the winch, deleting for simplicity in illustration any showing of the guard screen which extends laterally from both sides of the standard on which the canopy-mounted winch is sustained.
Figure 4:
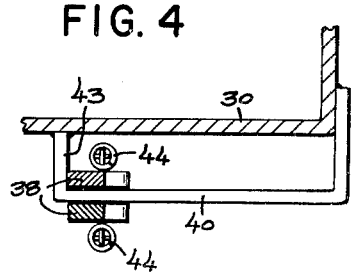
FIG. 4 is a fragmentary horizontal sectional view drawn to an enlarged scale on line 4—4 of FIG. 3.
Figure 4:
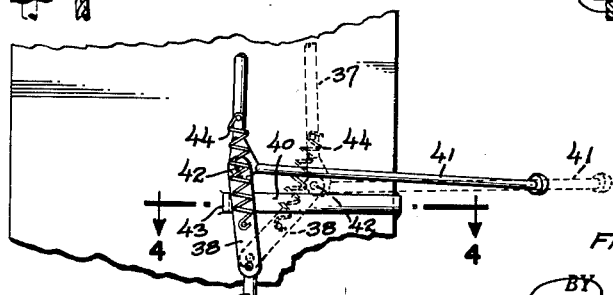

The upper section 37 of the jointed connecting rod has a fixed control handle 41 extending forwardly in a generally horizontal plane from its lower end. By means of this handle the pivot pin 42 which produces the joint for the rod can be manually shifted from a forward position in which the two sections of the connecting rod are in the collapsed condition represented by broken lines in FIG. 3 into the in-line condition represented by full lines. A stop 43 prescribes the limit to which the sections move in attaining this in-line condition, at which point the pivot pin will have moved through and slightly beyond center, being yieldingly held in this over-center position by springs 44 located upon opposite sides of the two links 38.

The lower exposed stem 20 of the valve's control spool is linked, as at 45, to the crank extension 46 of a manual control handle 47. This latter control handle is intended to be employed only when the jointed connecting rod is collapsed. Vertical motion of the valve spool by manual operation of handle 47 permits the spool to select both the direction and the speed of the winding drum. The act of pushing handle 41 rearwardly to bring the two sections of the connecting rod into an in-line condition brings the cross-arm of the U-bar into play, whereupon the spool is made subject to depression pressures exerted by the tow-line upon the cross-arm. These depression pressures move the spool only from neutral through the spool's range of "reverse" motion. In FIG. 5 I have illustrated the spool in its normal neutral position. It is free to move in either vertical direction against the yielding resistance imposed by a spring 51. The stem 19 is unattached to the spool but bears upon a stem 52 which is integral with the spool. A snap-ring 53 is provided on the head end of the fixed stem and catches over an inturned flange presented by an upper spring follower 54. A lower spring follower 55 bears upon the upper end of the spool proper. It will be apparent that the spring is compressed either by downward motion of the follower 54 or upward motion of the follower 55, with the stem 20 being operative to accomplish both of such motions while stem 19 is effective to accomplish only downward motion. As a taut condition of the tow-line depresses the cross arm 34 in a greater or lesser degree from the normal elevated level into which the same is yieldingly urged by force of the spring 51, there is perforce provided an automatic regulation of the speed at which the winding drum must turn in order that the line will be payed out as fast, and only as fast, as the same is required. More particularly stated, the winding drum 39 is motionless when the tow-line is in the slack condition in which the same is illustrated by dash and dot lines in FIG. 3. As a pull is exerted on the after end of the line, the line of course tends to straighten out. Reacting to this pressure, the cross-arm of the U-bar is forced downwardly and the winding drum 39 is responsively powered in reverse, turning at the speed dictated by the degree to which the cross-arm of the U-bar is depressed.

The arrangement as between the winding drum 39 of the winch, the cross-arm 34 of the U-bar, and the sheave 27 of the fairleader is of particular import. As can be seen from an inspection of FIG. 6 the cross-arm 34 of the U-bar 33 lies more or less vertical when located in the inoperative forward extreme of its permitted swing motion. This position is designated by the letter *a*. When shifted rearwardly into the operation position *b* the cross-arm then has a reciprocal swing travel path extending between two lines *d* and *e*, the former running from the winding drum 39 to the sheave 27 tangent to the near perimeters and the latter being projected from approximately the rotary center of the winding drum tangent to said near perimeter of the sheave. This is to say that the range of operating motion to which the cross-arm 34 admits as the same moves in said swing travel, by pressure exerted from the cable 11 as the latter is pulled from the drum, is between said projected lines *d* and *e*, the control valve 16 progressively increasing the volumetric flow of pressure fluid fed to the fluid motor of the winch as said cross-arm nears the projected line *d*, and progressively decreasing such flow as the cross-arm nears the projected line *e*. Should the cable be completely run off the drum, the winding drum will perforce stop as the drum-anchored inner end of the cable reaches substantially a perpendicular dropped from the rotary center of the drum. The cable cannot, in consequence, continue its reverse rotation and cause the cable to wind itself upon the drum in a direction opposite the intended wind.

A guard screen 48 extends laterally as a shroud from both sides of the channel standard 30.

In a broad aspect the automatic reversing feature of the present invention is a division of my above-identified United States Patent No. 2,959,396.

It is believed that the invention and its operation will have been clearly understood from the foregoing detailed description of my now-preferred illustrated embodiment. Changes within the spirit of the invention will suggest themselves. It is my intention that no limitations be implied and that the hereto annexed claims be given the broadest interpretation to which the employed language fairly admits.

What I claim is:

1. In a reversible winch assembly, the combination of a winding drum, means operatively connected with the drum for driving the same in either a forward or reverse direction, selectively, means for controlling the speed at which said driving means drives the drum, and a means on which a line wound on the drum bears as it is payed out from the drum arranged for movement relatively with the pressure exerted by said line and so interconnected with the speed controlling means as to decrease and increase drum speed automatically in response to lesser or greater pressures reflecting slack and taut conditions, respectively, of the line.

2. In a reversible winch assembly, the combination of a winding drum, a reversible fluid motor, a driving connection from said motor to the drum, a source of fluid under pressure, a control valve movable selectively between a normal neutral position and either of two operating stations one of which connects the source with the "reversing-drive" side of the fluid motor and the other of which connects the source with the "forward-drive" side of the fluid motor, in both instances simultaneously relieving pressure upon the non-selected side of the motor, and a means on which a line wound on said drum bears as it is payed out from the drum movable relatively with the pressure exerted by said line and so interconnected with the control valve as to move the same from neutral toward and from the valve's "reversing-drive" operating station, greater or lesser pressures exerted from said line reflecting taut and slack conditions, respectively, of the line.

3. In a reversible winch assembly, the combination of a winding drum, a reversible motor, a driving connection from said motor to the drum, a control member for the motor movable selectively between a normal neutral position and either of two operating positions one of which causes the motor to turn in a cable-winding direction and the other of which causes the motor to turn in a cable-unwinding direction, a means on which a cable wound on the drum bears as it is payed out from the drum movable from a normal elevated position reflecting a slack condition of the cable into and from a depressed position reflecting a taut condition of the cable, and an operative interconnection from said means to the control member causing the latter to move automatically from neutral toward the "cable-unwinding" operating position as pressure on said means increases and to return toward neutral as pressure on said means decreases.

4. Structure according to claim 3 having means for inactivating said operative interconnection at will so that the control member can be employed to control the operation of the motor without being subject to changes in the tautness condition of the cable.

5. In combination with the winding drum and reversible fluid motor of a reversible hydraulic winch, a manually operated shuttle valve occupying an intervening position between said motor and a source of fluid pressure therefor and operating to control the directional travel and the speed of the motor, and means operated by a control arm activated by direct engagement with a line being payed out from the drum acting automatically to shift the shuttle valve so as to decrease the speed when the line being payed out slackens off and to increase the speed when the line being payed out tightens up, yielding means being provided normally urging the shuttle valve into a position isolating the motor from the pressure source.

6. In combination with a tractor, a fairleader providing a swing-frame and mounted upon the aft end of the tractor for swivel movement of said swing-frame about a vertical axis, a trailer for the tractor of the type providing a logging arch and providing a draw-bar so attached by its front end to the swing-frame of the fairleader that the latter swings bodily with the trailer about said swivel axis of the fairleader, and a winch mounted upon the tractor in a position to pay out and receive cable guided by the fairleader to and from the arch of said logging-arch trailer.

7. Structure according to claim 6, said swivel mounting for the fairleader comprising two trunnions one of which has a hollow center, and wherein the cable in its run between the fairleader and the winding drum of the winch passes through said hollow center of the hollow-centered trunnion.

8. Structure according to claim 7 in which the tractor is provided at its rear end with a pair of vertically spaced arms describing a rearwardly facing yoke and has a hollow open-top standard footing upon the upper of said vertically spaced arms, said fairleader being swivel-mounted between said yoke arms with said hollow-centered one of the two trunnions lying uppermost and having its hollow center communicating with the hollow center of the standard, and wherein the winch surmounts said standard with its winding drum overlying the top opening thereof.

9. Structure according to claim 6 in which the tractor has a canopy, said fairleader occupies a position adjacent the ground, and the winch is mounted at the aft end of the canopy so as to be elevated a substantial distance above the fairleader.

10. In combination with a tractor having at the aft end a rearwardly facing yoke the two arms of which are vertically spaced, a hollow open-top standard made integral with the tractor frame and overlying the yoke, a horizontal winch surmounting the standard with its winding drum overlying said top opening of the standard, and a fairleader journaled by trunnions between said yoke arms for swivel movement about a vertical axis, the upper trunnion having a hollow center communicating with the hollow center of the standard and giving access for cable fed to the fairleader from the winding drum of the winch.

11. In combination with a tractor having at the aft end a rearwardly facing yoke the two arms of which are vertically spaced, a hollow open-top standard made integral with the tractor frame and overlying the yoke, a horizontal winch surmounting the standard with its winding drum overlying said top opening of the standard, a fairleader journaled by trunnions between said yoke arms for swivel movement about a vertical axis, the upper trunnion having a hollow center communicating with the hollow center of the standard and giving access for cable fed to the fairleader from the winding drum of the winch, power means for driving the winding drum of said winch both for taking in and paying out cable, a control valve governed by an axially movable spindle and so associated with the winch as to control the speed at which the winding drum is driven by said power means, said valve being mounted alongside the standard with its spindle vertically disposed, a cross-arm mounted within the hollow center of the standard for fore-and-aft swing movement about a horizontal pivot through a swing arc traversing the line travelled by cable as it is drawn from the winding drum to the fairleader, a jointed vertically disposed rod connecting said valve spindle with a crank arm fixed to a projecting end of a pivot shaft for said cross-arm, normally operated means for moving the joint of said jointed connecting rod through an over-center travel from an inoperative position collapsing the joined sections into an operative position placing the sections in approximately an in-line condition, endwise movement of the in-line sections by cable-actuated swing motion of the cross-arm imparting axial winch-controlling movement to the valve spindle, said act of collapsing the jointed connecting rod placing the cross-arm in an out-of-the-way position, and means independent of the jointed connecting rod and subject to manual control for imparting axial winch-controlling movement to the valve spindle when said jointed connecting rod is collapsed.

12. In combination with a tractor having at the aft end a rearwardly facing yoke the two arms of which are vertically spaced, a hollow open-top standard made integral with the tractor frame and overlying the yoke, a horizontal winch surmounting the standard with its winding drum overlying said top opening of the standard, a fairleader journaled by trunnions between said yoke arms for swivel movement about a vertical axis, the upper trunnion having a hollow center communicating with the hollow center of the standard and giving access for cable fed to the fairleader from the winding drum of the winch, power means for driving the winding drum of said winch both for taking in and paying out cable, a valve so associated with the winch as to control the direction and speed at which said power means drives the winch, a cross-arm mounted within the hollow center of the standard for fore-and-aft swing movement about a horizontal pivot through a swing arc traversing the line travelled by cable as it is drawn from the winding drum to the fairleader, a jointed vertically disposed rod connecting said valve with a crank arm fixed to a projecting end of a pivot shaft for said cross-arm, manually operated means for moving the joint of said jointed connecting rod through an over-center travel from an inoperative position collapsing the joined sections into an operative position placing the sections in approximately an in-line condition, endwise movement of the in-line sections by cable-actuated swing motion of the cross-arm imparting such motion to the valve as controls the speed at which the winding drum pays out cable, said act of collapsing the jointed connecting rod placing the cross-arm in an out-of-the-way position, and manually controlled means arranged to be employed when said jointed connecting rod is collapsed for giving to the valve such controlled motion as regulates both the direction and the speed at which the winding drum is driven by said power means.

13. Structure as recited in claim 12 having the drawbar of a trailing logging arch so attached to the fairleader that the two turn bodily as one about said swivel axis of the fairleader.

14. In combination with a canopied tractor having at the aft end a rearwardly facing yoke the two arms of which are vertically spaced, a hollow open-top standard made integral with the tractor frame in a position overlying the yoke and extending vertically from said yoke to the canopy, a horizontal winch surmounting the standard to the rear of the canopy with its winding drum overlying said top opening of the standard, a fairleader journaled by trunnions between said yoke arms for swivel movement about a vertical axis, the upper trunnion having a hollow center communicating with the hollow center of the standard and giving access for cable fed to the fairleader from the winding drum of the winch, and latticework shrouds extending laterally from the two sides of the standard to the approximate side edges of the tractor.

15. In combination with a tractor having at the aft end a rearwardly facing yoke the two arms of which are vertically spaced, a hollow open-top standard made integral with the tractor frame and overlying the yoke, a horizontal winch surmounting the standard with its winding drum overlying said top opening of the standard, a fairleader journaled by trunnions between said yoke arms for swivel movement about a vertical axis, the upper trunnion having a hollow center communicating with the hollow center of the standard and giving access for cable fed to the fairleader from the winding drum of the winch, power means for driving the winding drum of said winch both for taking in and paying out cable, a reciprocally movable control valve so associated with said power means and the winch that movement in one direction from a centered neutral progressively increases the speed at which the winding drum turns in a cable "pay-out" direction, and movement in the other direction from said centered neutral progressively increases the speed at which the winding drum turns in a cable "take-in" direction, a cross-arm pivot-mounted within the hollow center of the standard for fore-and-aft swing movement about a horizontal axis through a swing arc traversing the line travelled by cable as it is drawn from the winding drum to the fairleader, means connecting said cross-arm with the valve and operating to move the latter in concert so as to have the winding drum responsively turn at a speed relatively in correspondence with a greater or lesser degree of swing travel by the cross-arm reflecting the tautness condition of cable pressing against the cross-arm, means for inactivating said connecting means at will, and manually controlled means operable when said connecting means is inactive for moving the valve in either direction from said centered neutral.

16. In combination: a winch, variable-speed power means for driving the winding drum of said winch both for taking in and paying out cable, a fairleader to which cable wound on the winding drum of the winch is fed as said cable is payed out from the drum, a member occupying a position between the drum and the fairleader and mounted for movement reciprocally along a travel path at cross-angles to the line travelled by said cable into and out of engagement with the cable, means for placing said reciprocally-mounted member in either an operating position whereat the same presses against the cable or an inoperative out-of-the-way position, a speed control for the power means, a connection from the reciprocally mounted means to the speed control automatically activating the latter to responsively increase and decrease the speed at which the drum pays out cable according as the pressure of the cable upon said reciprocally mounted means reflects a relative taut and a slack condition, respectively, and means independent of said reciprocally mounted means manually controlled for increasing and decreasing the speed at which the drive means powers the drum when the reciprocally mounted means occupies its inoperative out-of-the-way position.

17. Structure according to claim 16, said winch being a reversible hydraulic unit, and wherein the speed-controlling connection includes a shuttle-spool spring-loaded so as normally to occupy a neutral position, the spring for said spool performing the added function of yieldingly countering cable pressure exerted upon the reciprocally mounted means when the latter occupies its operating position.

18. Structure according to claim 1, said line having its inner end attached to the drum, the range of movement of said means on which the line bears being such that when the line is completely run out from the drum so as to extend radially of the drum from said attached inner end said means moves into a position whereat the speed controlling means responsively arrests the rotation of the drum.

19. Structure according to claim 1 characterized in that line being payed out from the drum occupies an established tangent of the winding drum when such line is taut, and wherein said means on which the line bears has a predetermined travel path at cross-angles to said established tangent, movement of said means in a predetermined degree along said travel path from said established tangent toward an intersecting line which is projected tangent to the opposite side of the drum responsively causing the speed controlling means to arrest the rotation of the drum.

No references cited.